United States Patent [19]

Parker et al.

[11] Patent Number: 5,528,704
[45] Date of Patent: Jun. 18, 1996

[54] IMAGE RESOLUTION CONVERSION USING A PLURALITY OF IMAGE REGISTRATIONS

[75] Inventors: James D. Parker; Robert E. Coward, both of Rochester, N.Y.

[73] Assignee: Xerox Corporation, Stamford, Conn.

[21] Appl. No.: 333,083

[22] Filed: Oct. 31, 1994

Related U.S. Application Data

[63] Continuation of Ser. No. 151,668, Nov. 15, 1993, abandoned.

[51] Int. Cl.$^6$ ...................................................... G06K 9/42
[52] U.S. Cl. ........................... 382/299; 382/237; 358/451
[58] Field of Search .................................. 382/268, 269, 382/299, 237, 251; 358/401, 450, 451; 348/443, 458, 459, 596

[56] References Cited

U.S. PATENT DOCUMENTS

| | | | |
|---|---|---|---|
| 4,068,266 | 1/1978 | Liao | 358/280 |
| 4,528,693 | 7/1985 | Pearson et al. | 382/47 |
| 4,569,081 | 2/1986 | Mintzer et al. | 382/47 |
| 4,742,553 | 5/1988 | Irwin | 382/47 |
| 4,783,838 | 11/1988 | Matsunawa | 382/51 |
| 4,827,352 | 5/1989 | Yoneda et al. | 358/287 |
| 4,829,587 | 5/1989 | Glazer et al. | 382/47 |
| 4,975,785 | 12/1990 | Kantor | 353/447 |
| 4,979,229 | 12/1990 | Moolenaar | 382/56 |
| 5,025,325 | 5/1991 | Hudson | 358/447 |
| 5,113,455 | 5/1992 | Scott | 382/47 |
| 5,123,082 | 6/1992 | Shimada | 382/47 |
| 5,185,674 | 2/1993 | Tai | 358/457 |
| 5,208,871 | 5/1993 | Eschbach | 382/41 |
| 5,221,976 | 6/1993 | Dash et al. | 358/486 |
| 5,226,094 | 7/1993 | Eschbach | 382/41 |

OTHER PUBLICATIONS

Xerox Disclosure Journal, vol. 17 No. 3 May/Jun. 1992 Converting Between Write–White, Write–Black and Neutral Bitmaps p. 181.

Xerox Disclosure Journal, vol. 18, No. 4, Jul./Aug. 1993 Hardware Architecture For Nearest Neighbor Image Processing Algorithms p. 451.

Xerox Disclosure Journal, vol. 18, No. 2, Mar./Apr. 1993 Area Mapping Table Look Up Scheme.

Xerox Disclosure Journal, vol. 18, No. 5, Sep./Oct. 1993 "Hardware Architecture for Resolution Converison Using Area Mapping" by Papaconstantinous, p. 553.

Primary Examiner—Leo Boudreau
Assistant Examiner—David R. Anderson

[57] ABSTRACT

An image processing apparatus in a reproduction system includes an image input terminal having a device resolution of K pixels per unit length by L pixels per unit length (K x L). Each pixel is defined at a depth b representing one of b optical densities. The image input terminal emits an input image at the device resolution and depth (KxLxb). A memory is provided for receiving and storing as electrical signals the input image emitted from the image input terminal. A first processing means converts the resolution of the input image to a plurality of output images at a second resolution of M pixels per unit length by N pixels per unit length (M x N). Each pixel is defined at depth d representing one of d optical densities. The first processing means converts the input image to the plurality of output images by spatially offsetting a periodically repeating mapping defining the conversion between the input image and the output image. A second processing means forms a distribution of the plurality of output images. The second processing means selects a composite output image from the distribution of output images and stores the composite output image in the memory. An image output terminal having a device resolution and depth of M x N x d, is adapted for reproducing the composite image stored in the memory.

15 Claims, 9 Drawing Sheets

IMAGE RESOLUTION CONVERSION USING A PLURALITY OF IMAGE REGISTRATIONS

This is a continuation of application Ser. No. 08/151,668, filed Nov. 15, 1993, now abandoned.

BACKGROUND OF THE INVENTION

The present invention relates generally to digital image processing, and more specifically to a method and apparatus for electronically converting images from one resolution to another with improved image qualify by spatially offsetting the registration between the two resolutions.

Image information, be it color or black and white, is commonly generated by an image input terminal (IIT) in a raster format at a particular resolution and depth K x L x b, where K is a number of spots per unit of length in one dimension, L is a number of spots per unit length in the other dimension, and b is the depth or number of gray or color levels of each pixel (picture element). Image input terminals (IITs) that generate raster image information include scanners and computer image drivers. Image information from an IIT is typically in a format that is adapted to match the capabilities of a particular image output terminal (IOT) to which image information is to be reproduced (printed or displayed). Consequently, resolution conversion, i.e., converting a raster from first resolution and depth K x L x b to second resolution and depth M x N x d, is an important interoperability enabler in distributed imaging environments that have IITs and IOTs with different device resolution and density.

Distributed imaging environments require that a digital image is created at one resolution and printed, archived or displayed at another resolution. Ideally, resolution conversion of raster images should appear fast and transparent to users, while causing little if any image degradation. Increasingly, the resolution available from printers varies over a wider range. Printer resolutions are available over a range, for example, from less than 200 spi to to more than 600 spi. Printer resolutions vary for a number of reasons that generally are related to image quality. Simply printing a 300 spi bitmap at 400 spi or 600 spi is undesirable, however, since the image will be reduced substantially in size on the output page or display. It is therefor highly desirable to provide the capability of printing any image at any resolution, while selecting the output size. Scaling, or magnification and reduction is an operation essentially identical to resolution conversion, except that in scaling the objective is to obtain an image that is a different size at the same resolution. For these reasons, current image processing technology is focused upon means for converting image data from a first resolution to a second resolution.

Simple methods of resolution conversion are fast in terms of speed but generally have a tendency to generate very poor image quality. Bit doubling of an original bitmap image, for example, is a simple scheme leaving a large number of problems unresolved. Among these problems are image erosion and dilation, which occur when images are optimized for write-white or write-black printers. Erosion occurs when images destined for write-black printers are sent to write-white printers resulting in thinner lines than desired. Examples of methods that alleviate erosion problems are disclosed by Eschbach in "Converting between Write-White, Write-Black, and Neutral Bitmaps", Xerox Disclosure Journal, Vol. 17, No. 3 May/June 1992, p. 181, and U.S. patent application Ser. No. 07/588,125 by Mailloux, now U.S. Pat. No. 5,410,615, entitled "Bitmap Image Resolution Converter Compensating for Write-White Xerographic Laser Printing", Filed Sep. 25, 1990 published in JP-A 4-299663 on Oct. 22, 1992. Another problem with simpler forms of resolution conversion is halfbitting. Halfbitting optimizations occur in lower resolution images in order to achieve a higher resolution effect at image edges. Both halfbitting and erosion and dilation problems occur because bit doubling does not preserve the local density intent of an image over a given area. As a result, artifacts are produced giving a resolution converted image a different appearance from an original.

Methods that convert gray images to binary or another number of levels while attempting to preserve the local density of an image over a given area exist in applications separate from resolution conversion. These and similar methods might be applied as one part of the method in resolution conversion. One method, which can be used to prepare an image at a given resolution and density of I x J x a for printing on a printer with resolution M x N x d, is error diffusion as described in "An Adaptive Algorithm for Spatial Greyscale, by Floyd and Steinberg, Proc. of the S.I.D. 17/2, 75–77 (1976) (hereinafter, "Floyd and Steinberg"). Current distributed environments require a greater degree of flexibility from resolution conversion schemes, as the following more recent advances teach.

More elaborate methods of resolution conversion other than pixel doubling have been developed that are slower than simple methods but are still quite fast and result in better but not perfect image quality. For example, linear combination resolution conversion techniques such as area mapping as taught by Coward in "Area Mapping Table Look Up Scheme", Xerox Disclosure Journal, Vol. 18, No. 2, March/April 1993, p. 217, and by Papaconstantinou in "Hardware Architecture For Resolution Conversion Using Area Mapping", Xerox Disclosure Journal, Vol. 18, No. 5, September/October 1993, p. 553, and nearest neighbor taught by Coward et al. in "Hardware Architecture for Nearest Neighbor Image Processing Algorithms", Xerox Disclosure Journal, Vol. 18, No. 4, July/August 1993, p. 451, provide inadequate image quality when converting halftone images. More specifically, linear combination resolution conversion techniques have a tendency to create errors at boundaries of tiled images that are spatially oriented using a template. Other elaborate methods of resolution conversion of interest include: U.S. patent application Ser. No. 07/513,415, entitled "Bit-Map Image Resolution Converter", now U.S. Pat. No. 5,282,057, filed Apr. 12, 1990 (published at JP-A 4-227584 on Aug. 12, 1992) contemplates a method of magnifying, by a predetermined magnification factor (n), the original image pixels in two dimensions. U.S. patent application Ser. No. 07/737,297, entitled "Method of Resolution Conversion", now U.S. Pat. No. 5,282,051, filed Jul. 29, 1991 (published at EP-A2 0 525 996 on Feb. 3, 1993) discloses a method that determines correlation values for a plurality of input pixels to obtain the intensity of the output pixels. Also of interest are the following applications: U.S. patent application Ser. No. 07/981,678, filed Nov. 25, 1992, to Kang et al., now U.S. Pat. No. 5,301,037, entitled Resolution Conversion With Simulated Multi-Bit Gray; U.S. patent application Ser. No. 7/802,790, filed Dec. 6, 1991, to Eschbach, now U.S. Pat. No. 5,293,254, entitled "Method for Maintaining Bit Density While Converting Images In Scale or Resolution"; and U.S. patent application Ser. No. 07/981,720, filed Nov. 25, 1992, to Kang, now U.S. Pat. No. 5,270,836, entitled "Resolution Conversion of Bitmap Images".

Employing sophisticated resolution conversion techniques does not insure that the resulting output image will have a desirable appearance. For instance, the output image can be excessively blocky and/or contain noticeable "jaggies." Hence, smoothing operations are sometimes used in conjunction with the conversion or scaling of the image as disclosed in U.S. patent application Ser. No. 07/895,063 entitled "Unquantized Resolution Conversion of Bitmap Images Using Error Diffusion", by Coward et al., now U.S. Pat. No. 5,363,213, Filed Jun. 8, 1992. Additionally, the following U.S. Patents relate to the area of resolution conversion: U.S. Pat. Nos. 4,742,553; 5,025,325; 4,829,587; 4,783,838; 5,226,094; 5,208,871; 5,185,674; 4,068,266; 4,827,352; 5,221,976; 4,975,785; 4,569,081; 4,528,693; 5,113,455.

All references cited in this specification, and their references, are incorporated by reference herein where appropriate for appropriate teachings of additional or alternative details, features, and/or technical background.

SUMMARY OF THE INVENTION

In accordance with the invention, there is provided an image processing apparatus in a reproduction system. The apparatus includes an image input terminal having a device resolution of K pixels per unit length by L pixels per unit length (KxL). Each pixel is defined at a depth b representing one of b optical densities. The image input terminal emits an input image at the device resolution and depth (KxLxb). A memory is provided for receiving and storing as electrical signals the input image emitted from the image input terminal. A first processing means converts the resolution of the input image to a plurality of output images at a second resolution of M pixels per unit length by N pixels per unit length (M x N). Each pixel is defined at depth d representing one of d optical densities. The first processing means converts the input image to the plurality of output images by spatially offsetting a periodically repeating mapping defining the conversion between the input image and the output image. A second processing means forms a distribution of the plurality of output images. The second processing means selects a composite output image from the distribution of output images and stores the composite output image in the memory. An image output terminal having a device resolution and depth of M x N x d, is adapted for reproducing the composite image stored in the memory.

In accordance with another aspect of the invention there is provided a method for converting an input image having a first resolution and depth to an output image being a second set of image signals and having a second resolution and depth. The method includes the steps of defining a periodic spatial orientation between the input image and the output image to form an optical density mapping between the input image and the output image, determining a set of spatial registrations that are offset from the periodic spatial orientation, each registration within the set of spatial registrations defining a unique optical density mapping of the input image for each output image, calculating a set of output images corresponding to each unique optical density mapping between the input image and the output image in the set of spatial registrations, forming a distribution of the set of output images resulting from the calculating step, forming a composite set of output images at the second resolution and depth, and storing the composite image to form the output image.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which:

FIG. 7 shows an input-output grid overlay of FIG. 3 wherein four input pixels are turned on;

DETAILED DESCRIPTION

Figure 1:
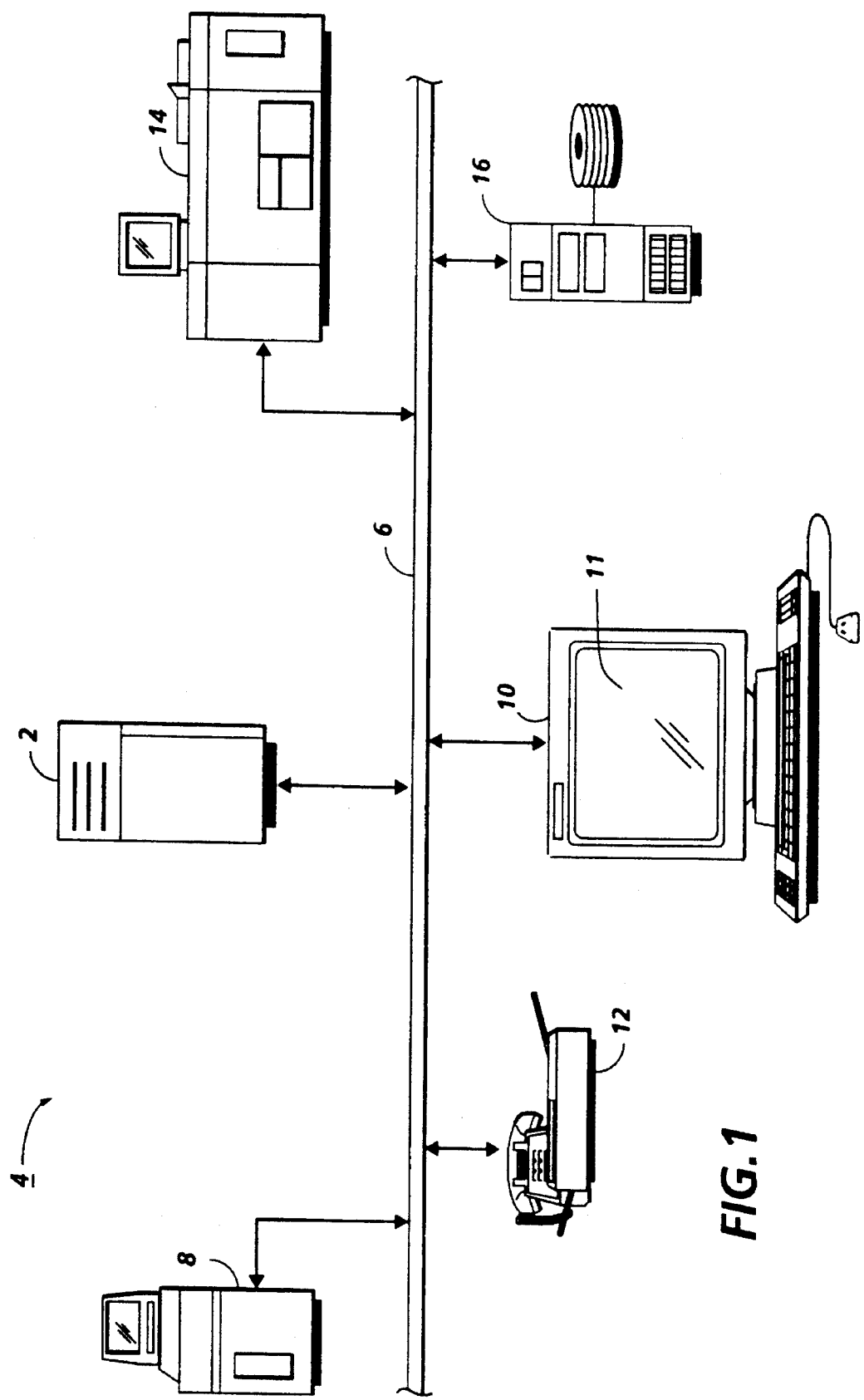
FIG. 1 is a distributed imaging environment incorporating the present invention.

Referring now to the drawings where the showings are for the purpose of describing the preferred embodiment of the invention and not for limiting same, raster image converter 2, incorporating the present invention, provides interoperability between network elements in distributed imaging environment 4 shown in FIG. 1. The network environment 4 is composed of collaborative systems, all of which are interconnected by network 6, that manipulate image information. The collaborative systems include scanning system 8, computer image driver 10 with display 11, facsimile system 12, printing system 14 and filing system 16. Electrical signals generated by scanning system 8, for example, encode image information in the form of continuous tone rasters, that can be defined as I x J x a where I is a number of spots per unit of length (e.g. spots per inch (spi)) in one dimension, J is a number of spots per unit length in the other dimension, and "a" is the depth or number of gray or color levels of each pixel (picture element). Interoperability problems, however, exist between the collaborative systems shown in FIG. 1 since the resolution and depth of image information which is input and output varies between each system. In other words, scanning system 8 and printing system 14 do not always operate on image information that have an identical resolution and depth. For example, scanning system 8 can operate at 300 spi and 8 bit gray (e.g. 256 gray levels) and printing system 14 can operate at 400 spi and 1 bit gray (black or white). Using raster image converter 2, however, image information in the form of continuous tone rasters can be converted from one depth and/or resolution to another depth and/or resolution, thereby providing interoperability between the collaborative imaging system shown in FIG. 1.

Image information does not necessarily have to be in the form of a raster, it can alternatively be in the form of text and graphics which can be generated by graphics development workstation 10 using a page description language (PDL) driver embedded therein. PDL drivers describe textual and graphical information using a high level page description language (PDL) such as Interpress used by Xerox® Corp., described in detail in "Interpress: The Source Book", by Harrington, S. J. and Buckley, R. R., Simon & Schuster, Inc., New York, N.Y.,1988. Unlike continuous tone rasters, text and graphics information is inherently device independent and therefore eliminate most interoperability problems between input and output devices. PDL drivers, however, do not always generate device independent images since for example, (binary, gray or color) raster information can be embedded in PDL images using the Interpress MAKEPIXELARRAY operator (see the Interpress reference above) along with text and graphics. Thus, even though PDL drivers are inherently device independent when describing an image with graphic and textual information, they become device dependent when rasters defined at a particular resolution and density are included in a PDL image description.

Figure 2:
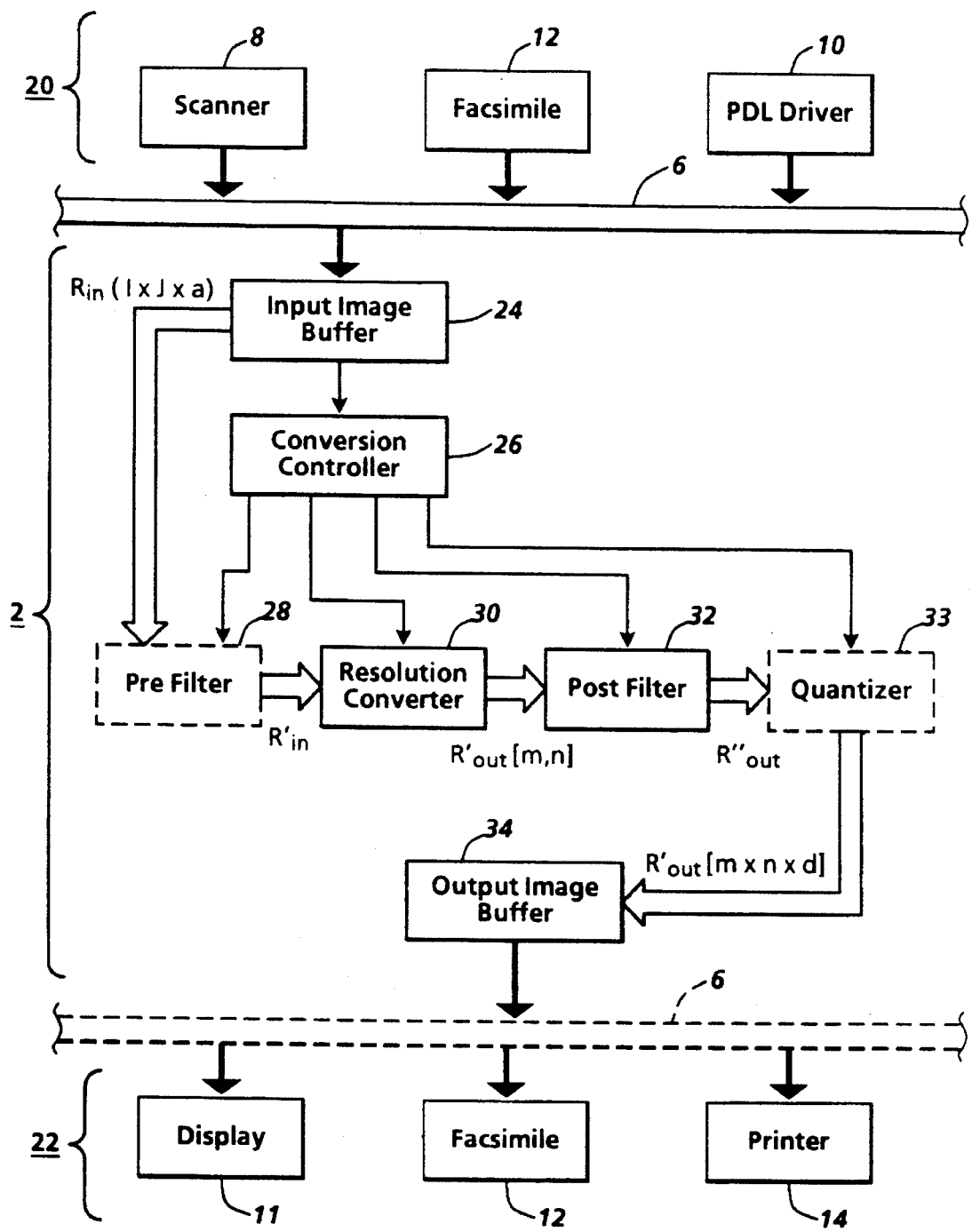
FIG. 2 is a detailed block diagram showing the present invention.

With reference now to FIG. 2 raster image converter 2 is shown in detail. Image input terminals (IITs) 20 (which include scanner 8, PDL driver 10 and facsimile 12) use raster image converter 2 to facilitate interoperability with image output terminals (IOTs) 22 (which include display 11, facsimile 12 and printer 14 (which can be gray, binary or color)) when operating at incompatible device resolution and/or depth. Conversion controller 26 of image converter 2 uses prefilter 28, resolution converter 30, post filter 32 and quantizer 33 to convert input raster images to output raster images having appropriate resolution and depth. By way of example, raster information generated by scanner 8 at 300 spi and 8 bit gray is transmitted using network 6 to raster image converter 2 (which is described herein as standalone on a remote server but can alternatively be resident on each IIT 20 or IOT 22), for conversion to a raster output resolution and density that are compatible with printer 14 at 400 spi and 1 bit gray.

Specifically, conversion controller 26 is notified upon receipt of a raster image in input image buffer or memory 24. Along with the notification of the receipt of an image for conversion, controller 26 receives the resolution and depth parameters (I x J x a) of the input raster image and the resolution and depth parameters (M x N x d) of the desired output raster image. Based on the input and output raster image parameters, controller 26 determines the input and output tile size, phases and registrations, all which is explained in detail below, along with how each service (prefilter 28, resolution converter 30, post filter 32 and quantizer 33) of raster image converter 2 will interact to generate the desired output raster image having parameters (MxNxd). For the purpose of illustrating converter 2, a symmetric linear combination conversion is described herein using an input resolution of K x L, where K=L=300 spi (spots per inch) and an input depth of 8 bits or a=256 and an output resolution of M x N, where M=N= 400 spi and an output depth of one or d=1.

After receiving the input and output raster image parameters, controller 26 determines whether input image $R_{in}$ stored in memory buffer 24 is to be processed by prefilter 28. Prefilter 28 is made up of any number of filters that have 55 different characteristics which can be used to better prepare input image $R_{in}$ for resolution converter 30, e.g. performing mild pixel interpolation or image smoothing, etc. In the preferred embodiment of the present invention, each available filter can scale the input image by two in both the fast and slow scan directions using known techniques such as the mapping technique described in U.S. Pat. No. A 4,742,553 to Irwin which teaches mapping of similarly sized input and output pixel groups. For example it may be desirable when performing a resolution conversion of 400 to 600 spi to first interpolate to 1200 spi using prefilter 28 thereby altering the resolution conversion to a decimation of 1200 spi to 600 spi.

A first filter in prefilter 28 does not interpolate input image $R_{in}$ and is environmentally independent. Environment independence means that the output image may be directed to either a write-white or write-black printer. Because pixel interpolation is not performed using the first filter (no image quality decisions are made), thereby making it fast while completely preserving the micro-structure of input image $R_{in}$. A second filter, in prefilter 28, has the characteristics of being device dependent and of being adjustable for any type of output device, e.g. write-white or write-black xerographic devices. For example, the method described in U.S. patent application Ser. No. 07/588,125 by Mailloux (published in JP-A-4299663), now U.S. Pat. No. 5,410,615, is an interpolation scheme optimized for converting write black data, destined for write-white printers, while smoothing. The smoothing eliminates half-bitten edges which might appear on characters. A third filter in prefilter 28, also interpolates and mildly smooths ragged edges and corners (jaggies), while not being environmentally dependent. The third filter maintains a sufficient amount of image micro-structure to act as a quality prefilter, by preserving it, for example, as additional gray density information.

Subsequent to processing input image $R_{in}$ using prefilter 28, input image $R'_{in}$ output from prefilter 28 or input image $R_{in}$ if conversion controller 26 elected not to prefilter input image $R_{in}$, is processed by resolution converter 30 based on an input and output tile size determined by conversion controller 26. In the preferred embodiment area mapping is used by resolution converter 30 to generate appropriate resolution (MxN) of output image Rout. Although resolution conversion is described herein using area mapping, it is understood that other linear combination techniques that use a fraction of each surrounding input pixel to describe an output pixel can be used, such as nearest neighbor methods as disclosed in U.S. Patent Application entitled "Unquantized Resolution Conversion of Bitmap Images Using Error Diffusion", by Coward et al., filed Jun. 8, 1992, Ser. No. 07/895,063, now U.S. Pat. No. 5,363,213, the pertinent parts of which are incorporated herein by reference. Also, although focus is on symmetric images, the method of resolution conversion disclosed herein is extendible to anamorphic image output that is required by for example fast scan high addressability black & white (monochrome) and color printers. For example, alternate conversions may have input and output resolutions with symmetric properties where K, M=L, N or asymmetric properties where K, M≠L, N.

In general resolution conversion methods that use a template or tile map or spatially orient a periodically repeating pattern throughout overlaying input and output images. With specific reference to the 300 spi to 400 spi resolution conversion example, the tile size of the input and output image are calculated using the greatest common divisor (GCD) between the input image and output image resolution by conversion controller 26. The greatest common divisor (GCD) for input resolution K and output image resolution M is defined as C, where:

$$C = GCD(K,M)$$
$$= GCD(300,400) = 100;$$

Using C, the input and output tile sizes are determined:

$$\begin{aligned}
\text{input tile size} &= (K/C) \times (L/C) \\
&= (300/100) \times (300/100) = 3 \times 3; \text{ and} \\
\text{output tile size} &= (M/C) \times (N/C) \\
&= (400/100) \times (400/100) = 4 \times 4.
\end{aligned}$$

Figure 3:
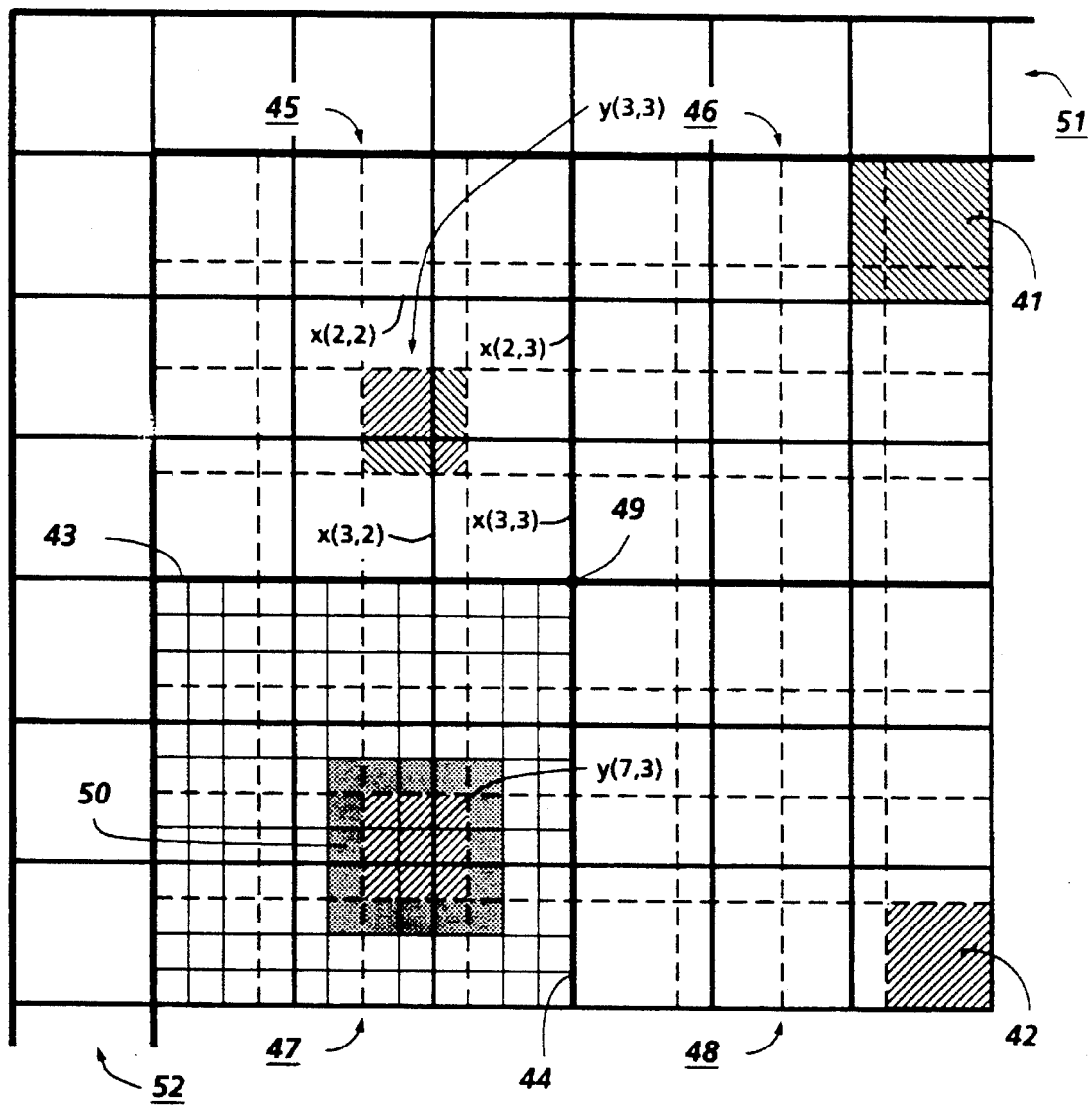
FIG. 3 is an input-output grid overlay for the four upper left-most tiles of a 300 spi input image and a 400 spi output image.

With reference now to FIG. 3, an input-output grid overlay for the four upper left-most tiles of the 300 spi input image (solid lines) having pixels indicated as 41 and of an output image (dotted lines) having a resolution of 400 spi and pixels indicated as 42, where corresponding relative pixel size, is shown. The center dark crossing lines 43 and 44 which divide four tiles 45, 46, 47 and 48, show the periodic nature of the input and output image, (i.e., given an input pixel at a known location in a tile, the overlay arrangement of a corresponding output pixel is always the same). In other words, the area within pixel boundaries that coincide with the repetition of input and output pixels defines a tile. For example, corner 49 intersects the four tiles 45, 46, 47 and 48, where the input image is represented by a 3x3 tile and the output image is represented by a 4x4 tile. The input and output images can consequently be broken down into a series of tiles that repeat at a predetermined spacing or period.

Resolution converter 30 in the preferred embodiment uses an area mapping technique, which is well known as a resolution conversion interpolation technique. An advantage to area mapping resolution conversion is that it minimizes moire patterns and false contours in half tone images. A further advantage is that, area mapping is ideal for parallel processing, like an array processor, since each area can be independently processed. Area mapping resolution conversion is an optical density mapping of an input image to an output image. Area mapping represents input pixels for a given input area to a corresponding output area as shown specifically by output pixel y(3,3) in FIG. 3. Since the size of the output area is identical to the input area, area mapping maintains the optical density and image structure of each output pixel as close to the input pixels as possible. For example, output pixel y(3,3) can be defined in terms of input pixels x(n,n) as follows using area mapping:

$$y(3,3) = \tfrac{2}{9} x(2,2) + \tfrac{2}{9} x(2,3) + \tfrac{2}{9} x(3,2) + \tfrac{1}{9} x(3,3),$$

where the values $\tfrac{1}{9}$, $\tfrac{2}{9}$ and $\tfrac{4}{9}$ represent the fraction of area output pixel y(3,3) that is covered by a given input pixel. Continuing with the example, if density is encoded 0 or 1 (black or white), and if input pixels x(3,3), x(2,3), x(3,2) and x(2,2) have respective values (1,1,1,0), then output pixel y(3,3) has the resulting gray value $\tfrac{5}{9}$. This area mapping technique can be used to determine each output pixel y(1,1), y(1,2), y(1,3), y(1,4), y(2,1), y(2,2), y(2,3), y(2,4), y(3,1), y(3,2), y(3,3), y(3,4), y(4,1), y(4,2), y(4,3) and y(4,4) in tile 45 once a linear combination of each input pixel in the following set of input pixels is determined: (x(1,1), x(1,2), x(1,3), x(2,1), x(2,2), x(2,3), and x(3,1), x(3,2), x(3,3)). All subsequent tiles, such as tiles 46, 47 and 48 use a similar set of linear combinations of input pixels or weights to represent each output pixel from a set of overlaying input pixels as shown for each output pixel in tile 45. Thus, once a matrix of weights for one tile is determined subsequent tiles need only reference the weight matrix determined for the first tile 45. Before invoking resolution converter 30, conversion controller 26 determines all the sets of linear combinations of input pixels corresponding to the input-output tile overlay or the input and output grid sizes shown in FIG. 3.

Figure 4:
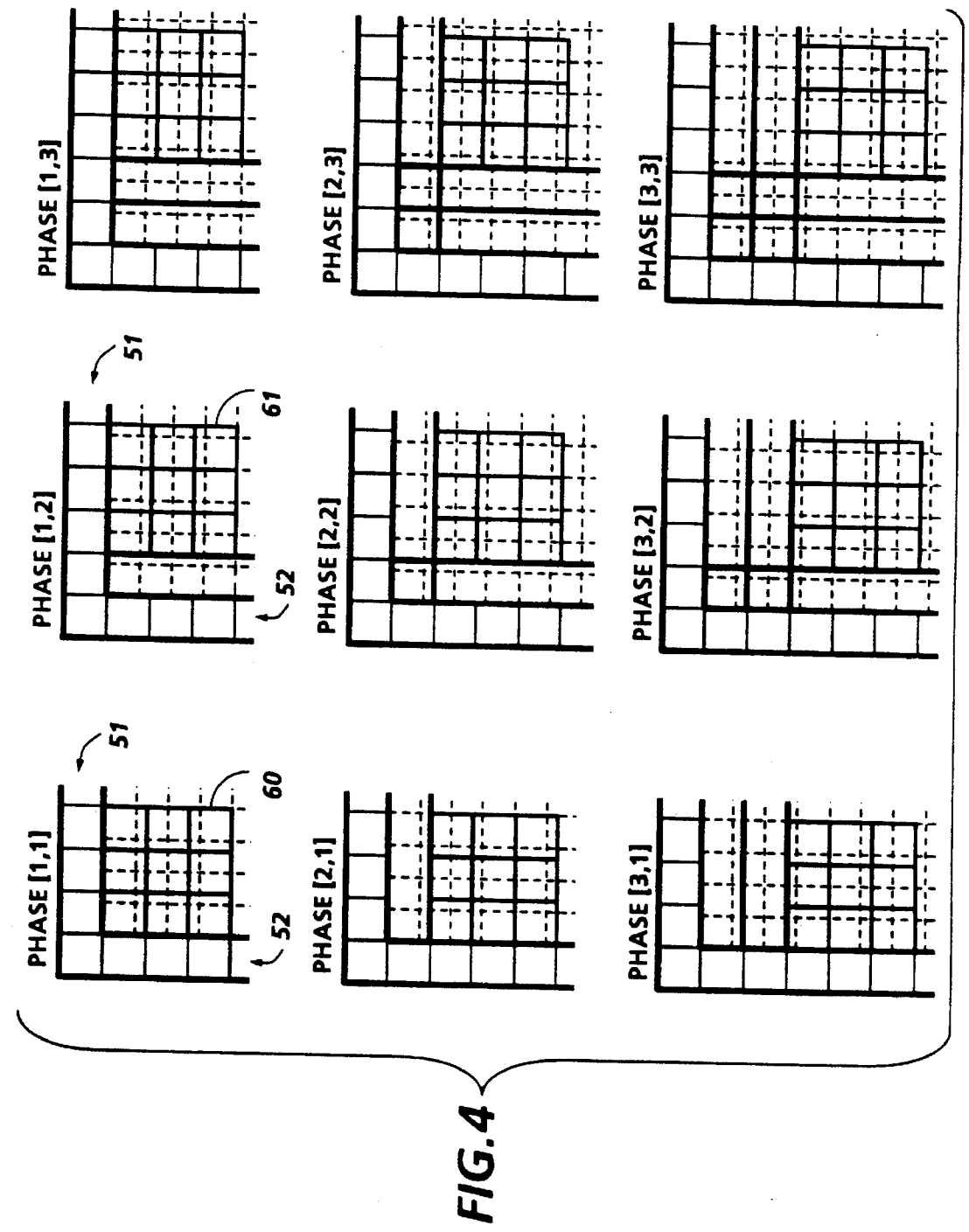
FIG. 4 shows all phases corresponding to one tile shown in FIG. 3.
Figure 5:
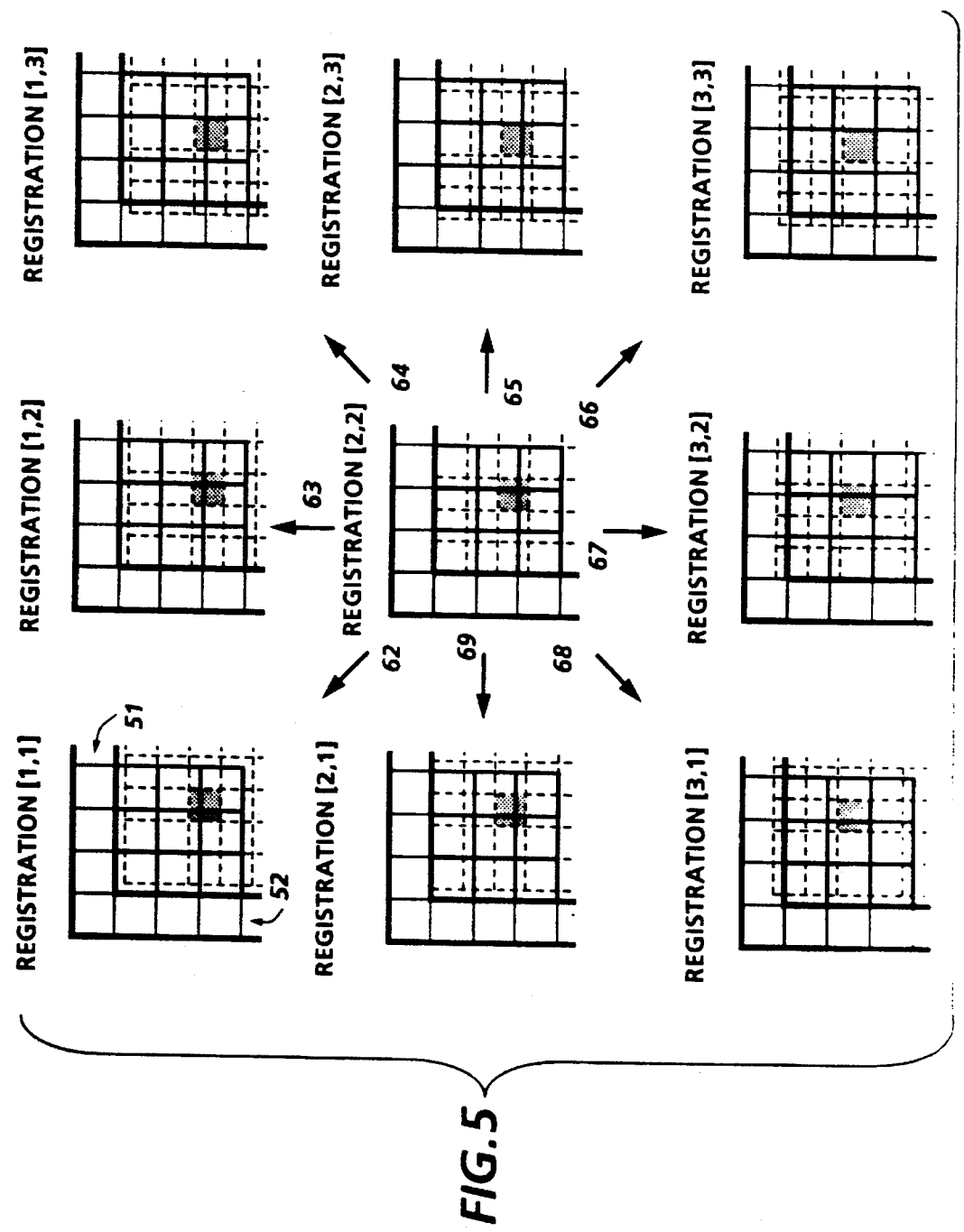
FIG. 5 shows the nine possible registrations for the example input-output grid overlay shown in FIG. 3.

In addition to determining all the sets of linear combinations of all input pixels described above, conversion controller 26 determines all possible phases that can occur within one period of a tile, and based on the number of phases determine different registrations that an output pixel can have in relation to overlapping input pixels. With reference now to FIG. 4, all phases corresponding to one tile 45 shown in FIG. 3 are explicitly shown in FIG. 4. Tile 45 in FIG. 3 (the upper left corner) has nine phases in one period of the input-output grid overlay. Similar to FIG. 3, the input image (solid lines) overlays the output image (dotted lines) in FIG. 4. The first phase 60 of the period moves to the right by one input pixel to create the next phase 61. All subsequent phases are created by either moving to the right by one input pixel or moving down by one input pixel from a previous phase. The number of phases an input-output grid overlay pattern has depends on the tile sizes determined for the input and output image resolutions Given the exemplary nine phases shown in FIG. 4 and with specific reference to the present invention, nine possible registrations for the input-output overlay grid shown in FIG. 3 are determined. In other words, using each possible phase of the periodic relationship between the input-output image grids, there exist a corresponding unique registration that each output pixel can have in relation to a corresponding set of input pixels. These different relationships establish a set of output images for a given input image. Thus, given that there exists nine phases of the input-output overlay grid, there exist nine corresponding unique output images that can be derived using each of the nine phases. FIG. 5 shows nine possible registrations that the input image (solid line) can have with the output image (dotted line). For example, output pixel y(3,3) is shown for each registration with a different input pixel overlay pattern. The nine input pixel overlay patterns are created by shifting the input image overlay in the direction of arrows 62 through 69 away from Registration [2,2]. Using the nine registrations shown in FIG. 5, there exist nine possible values for output pixel y(3,3), as illustrated by the following nine equations:

Registration [1,1]: $y(3,3) = \tfrac{1}{9}(x(2,2) + 2\,x(2,3) + 2x + 4\,x(3,3))$ Registration [1,2]: $y(3,3) = \tfrac{1}{9}(2\,x(2,2) + x(2,3) + 4\,x(3,2) + 2\,x(3,3))$ Registration [1,3]: $y(3,3) = \tfrac{1}{9}(3\,x(2,2) + 6\,x(2,2))$ Registration [2,1]: $y(3,3) = \tfrac{1}{9}(2\,x(2,2) + 4\,x(2,3) + 1\,x(3,2) + 2\,x(3,2))$ Registration [2,2]: $y(3,3) = \tfrac{1}{9}(4\,x(2,2) + 2\,x(2,3) + 2x(3,2) + 1\,x(3,3))$ Registration [2,3]: $y(3,3) = \tfrac{1}{9}(6\,x(2,2) + 3\,x(3,2))$ Registration [3,1]: $y(3,3) = \tfrac{1}{9}(3\,x(2,2) + 6\,x(2,3))$ Registration [3,2]: $y(3,3) = \tfrac{1}{9}(6\,x(2,2) + 3\,x(2,3))$ Registration [3,3]: $y(3,3) = x(2,2)$ These equations, which represent the input-output overlay grids for output pixel y(3,3) are consistent for each output pixel in other periods of the input-output grid overlay. For example output pixel y(7,3) shown in FIG. 3 has the same weights for corresponding output pixels as shown above for output pixel y(3,3). Additionally, FIG. 3 shows the increased surround or context 50 of output pixel y(7,3). Consequently all output pixels are provided with a larger equivalent surround or context which is similar to context 50. Also, since the input and output images are slightly offset at the edges of the input and output images and therefore do not always line up completely, a border or additional row 51 and column 52 of input pixels compensates for this offset.

Figure 6:
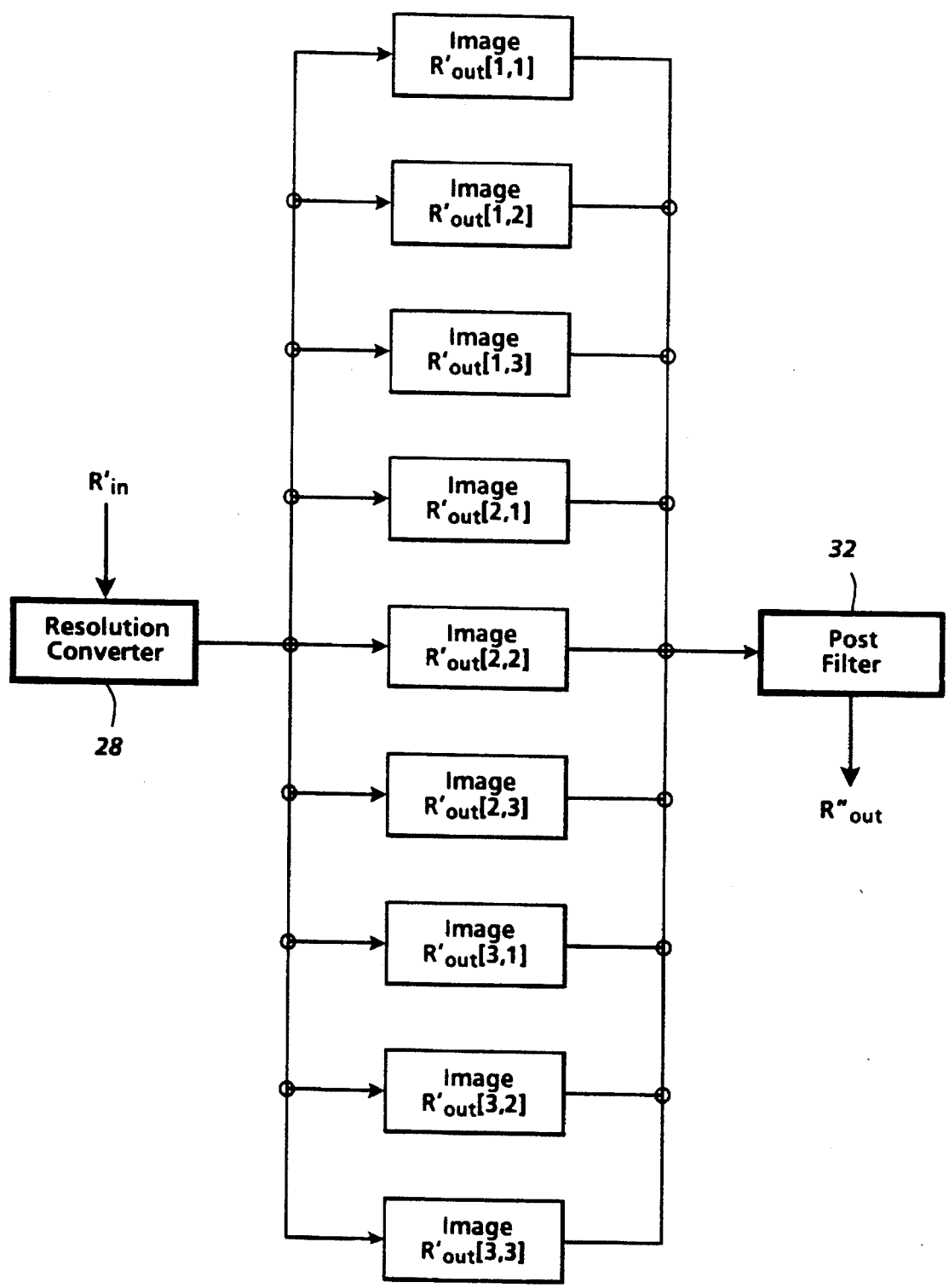
FIG. 6 shows the nine images generated for the nine image registrations shown in FIG. 5.

Once the total number of possible registrations have been determined for a given input-output pixel overlay, a set of linear combination of input pixels for each registration is defined by conversion controller 26. Each set of linear combination of input pixels is a derivative of the original set determined for registration [2,2]. This can be seen by noting that each registration is an offset from a previous registration by one pixel. Each registration shifts each area mapping representation by one pixel either vertically or horizontally. Conversion controller 26 begins by invoking resolution converter 30 for each registration determined between the input-output grid overlay to generate an output image corresponding to each registration. Along with input image $R'_{in}$ that was modified by prefilter 28 or image $R_{in}$ that was not modified by prefilter 28, conversion controller 26 provides resolution converter 30 with an area mapping set of linear combination of input pixels associated with a given registration. For example, for each of the nine registrations of the input image and output image shown in FIG. 5, nine corresponding output images $R'_{out}(1,1)$, $R'_{out}(1,2)$, $R'_{out}(1,3)$, $R'_{out}(2,1)$, $R'_{out}(2,2)$, $R'_{out}(2,3)$, $R'_{out}(3,1)$, $R'_{out}(3,2)$ and $R'_{out}(3,3)$ are generated as shown in FIG. 6. Conversion controller 26 subsequently transmits the aforementioned output images to postfilter 32 in order to generate a composite image representative of each of the nine output image registrations.

Figure 7:
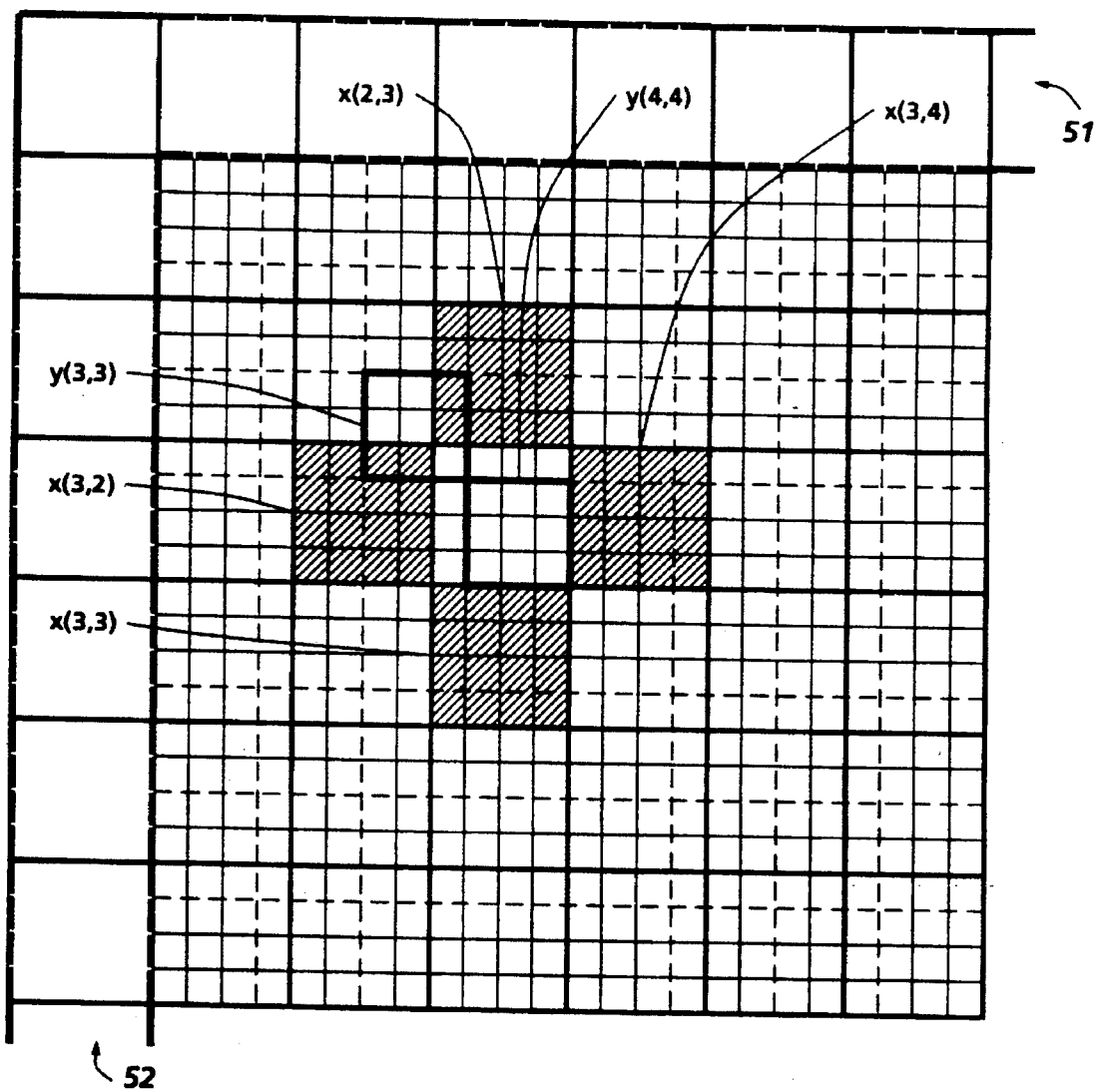
Figure 8:
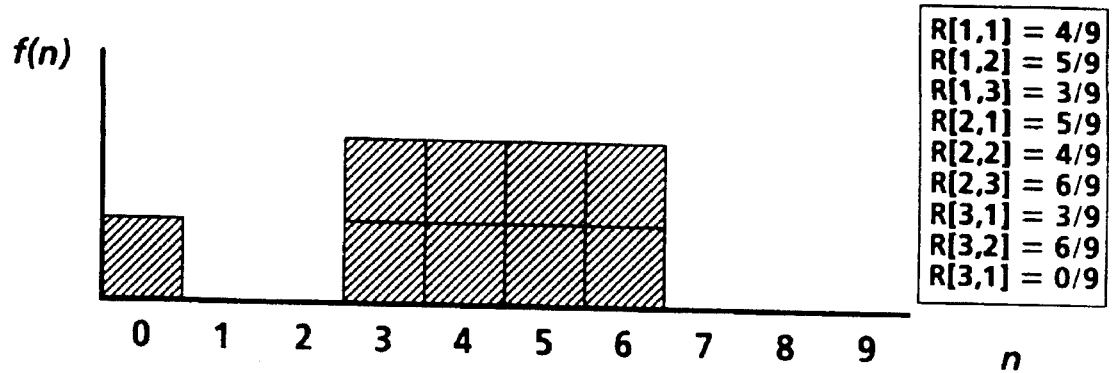
FIGS. 8 and 9 each show a distribution for an output pixel shown in the input-output grid overlay shown in FIG. 7.
Figure 9:
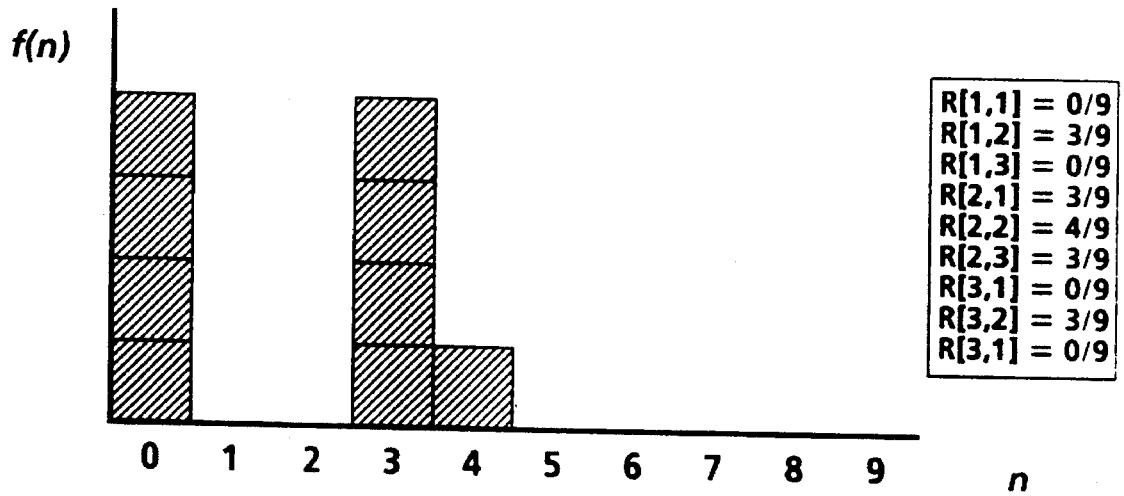

A composite image is generated by Postfilter 32 by finding the median value of a distribution representing all the possible output values for each registration. Continuing with the 300 spi to 400 spi example, FIG. 7 shows the same input-output overlay grid of FIG. 3 with four input pixels ON (x(2,3), x(3,2) and x(5,3)) and all other input pixels OFF. (Thus all pixels have either a value of one or zero (ON or OFF) for simplicity.) The distribution for all of the registrations R[n,m] for output pixels y(3,3) and y(4,4) are shown in FIGS. 8 and 9 respectively. FIG. 8 is an example of an output pixel that has an equivalent standard area mapping value (Registration [2,2]) and median value that are equal to the value 4/9. Alternatively, FIG. 9 has resulting median output or composite value equal to 3/9 which differs from conventional or standard output value (Registration [2,2]) equal to 0/9. Output pixel y(3,3) has similar input data as output pixel y(4,4) but contrasts it by being at a different phase. The median filter yields an output value for output pixel y(4,4) that is more uniform than would have been generated by standard area mapping Registration[2,2]. The example distribution for output pixel y(4,4) shows that there can exist a large spread in the output pixel values for a given set of input values depending on the original phase used when performing area mapping resolution conversion. Thus, there exists the possibility of making a decision for an output pixel value that could be detrimental to the image quality of the resolution converted output image.

Postfilter 32 provides a statistical measure of central tendency by using a statistical order filter that does not depend on a numerical value such as an average but on the order of the values of each output pixel, as shown for the nine possible realizations of each output pixel in the 300 spi to 400 spi example. The variations between each output pixel are reduced by selecting an output value which is more consistent or which is most likely to occur. Consequently, the image quality of output images is increased by the present invention by providing more consistent and more uniform output images while nearly preserving the density of the input image. In an alternative embodiment, postfilter 32 uses a mean filter sums each possible output pixel of each output image, output by resolution converter 30 and divides by the total number of output pixels summed. For example composite output pixel Y(3,3) is defined using each output pixel for each registration as the following equation shows:

$$Y(3,3) = 1/9 * (y_{R'out}(1,1) + y_{R'out}(1,2) + y_{R'out}(1,3) + y_{R'out}(2,1) + y_{R'out}(2,2) + y_{R'out}(2,3) + y_{R'out}(3,1) + y_{R'out}(3,2) + y_{R'out}(3,3)).$$

Figure 10:
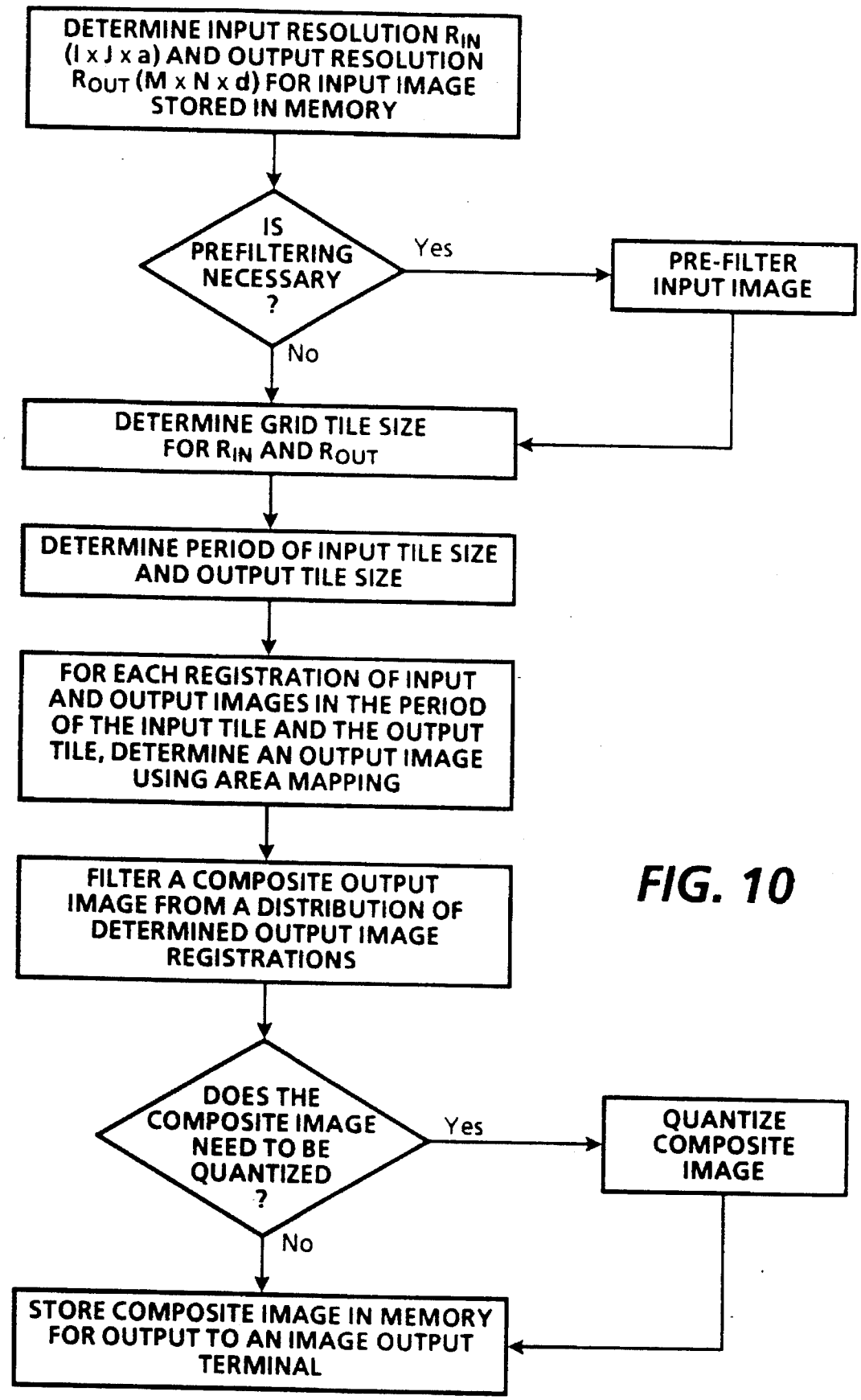
FIG. 10 is a flow diagram depicting the pertinent steps of the present invention.

If quantization is necessary after generating composite output image $R''_{out}$ generated by postfilter 32, the resulting composite image $R''_{out}$ is quantized using quantizer 33. Quantizer 33 quantizes image $R''_{out}$ resolution and depth (M x N x c) using error diffusion, thereby generating the final output image Rout at resolution and depth (M x N x d). Methods to quantize gray images to binary or a fewer number of levels while attempting to preserve the local density and sharpness are well known, and include among them error diffusion, as taught, for example, in Floyd and Steinberg. Another, more elaborate method would be the error diffusion techniques of U.S. Pat. No. A 5,045,952 to Eschbach, which serves to provide image dependent edge enhancement, both of which are incorporated herein by reference. The process flow of the resolution conversion method which is controlled by conversion controller 26 is summarized in the flow chart of FIG. 10. After quantization 33 or after postfiltering 32 if quantization was not necessary, output image $R_{out}$ with resolution and depth (M x N x d) is stored in image output buffer or memory 34. Image Rout stored in memory 34 is consistent with an image output terminal having device resolution and depth (MxNxd), such as printer 14, and can be subsequently transmitted from memory 34 to printer 14 for reproduction.

It will no doubt be appreciated that there are a number of possible linear combination resolution conversion methods that could be used effectively with the multiple input-output registration area mapping resolution conversion technique of the present invention. What is required by this invention is that an input image be first converted to a plurality of output images at different registrations using a linear combination resolution conversion method. The registrations of the plurality of output images, however, cannot be offset arbitrarily without adversely affecting the conservation of input image density in the output image. Using the plurality of output images, a composite output image is generated for reproduction on an image output terminal by forming a distribution of output images and filtering a composite output image therefrom. The resulting filtered output image closely preserves the image density of the input image by having consistent output values that have been moved towards a central tendency using a median filter.

The disclosed image processing system may be readily implemented in software using object oriented software development environments that provide portable source code that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method for converting an input image having a plurality of pixels of a first resolution and depth to an output image having a second plurality of image pixels of a second resolution and depth, comprising:

defining a periodic spatial orientation between the input pixels and the output pixels to form an optical density mapping between the input pixels and output pixels;

determining a set of spatial registrations that are offset from the periodic spatial orientation, each registration within the set of spatial registrations defining a unique optical density mapping of the input pixels for each output pixel;

calculating a set of output pixels corresponding to each input pixel and the output pixel in the set of spatial registrations;

forming a distribution of the set of output pixels resulting from said calculating step;

forming output pixel values at the second resolution and depth from the distribution of the set of output pixels; and storing the output pixel values to form an output image.

2. The method of claim 1, further comprising the step of prefiltering the input image, said prefiltering step including the steps of interpolating, and image smoothing to prepare the input image for said defining step.

3. The method of claim 1, further comprising the step of quantizing the depth of each output pixel to the second depth.

4. The method of claim 1, wherein said defining step comprises the step of using a greatest common divisor (GCD) between the first resolution of the input pixels and the second resolution of the output pixels to define an input tile and an output tile.

5. The method of claim 1, wherein said calculating step calculates in parallel each output pixel in the set of spatial registrations.

6. The method of claim 1, wherein said step of forming the output pixel values comprises the step of filtering a median value of the distribution of the set of output pixels.

7. An image processing apparatus in a reproduction system, comprising:

an image input terminal emitting, as electrical signals, input images having a plurality of input pixels with a resolution of K pixels per unit length by L pixels per unit length with each input pixel defined at a depth b representing one of b optical densities;

a first storage device for receiving the electrical signals from said image input terminal;

means, coupled to said first storage device, for performing input interpolation and smoothing to prepare the input images for processing;

first processing means, in communication with said performing means, for converting the resolution of input pixels to output pixels having a resolution of M pixels per unit length by N pixels per unit length, determining for each output pixel, a plurality of possible phases and first registrations of the output pixels with respect to the input pixels, each first registration providing a possible optical density value for the output pixels, for each of the possible first registrations of the output pixels, and determining a plurality of second registrations that are spatially offset from the first registrations;

means, coupled to said first processing unit, for forming a distribution of the plurality of second registrations for each output pixel;

second processing means, coupled to said forming means, for determining for each output pixel, a value for the output pixel that is a median value of the distribution of the plurality of second registration values;

means, coupled to said second processing unit, for quantizing the depth of each output pixel to the depth d;

a second storage device for receiving each output pixel from the quantizing means and storing as an electrical signal each output pixel; and an image output terminal adapted to receive the electrical signals from said second storage device.

8. The image processing apparatus of claim 7, wherein said first processing means forms an input tile and an output tile that are defined by a greatest common divisor (GCD), the GCD providing a periodically repeating mapping that spatially offsets the input tile and the output tile to define the conversion between the input image and the output image.

9. The image processing apparatus of claim 8, wherein said periodically repeating mapping is spatially offset by altering the input tile and the output tile mapping defined by the GCD to form a new periodically repeating mapping.

10. The image processing apparatus of claim 7, wherein each output pixel further comprises a linear combination of input pixels.

11. The image processing apparatus of claim 10, wherein the linear combination of input pixels is defined using area mapping.

12. The image processing apparatus of claim 7, wherein said first processing means processes the plurality of output pixels in parallel.

13. The image processing apparatus of claim 7, wherein said second processing means comprises a median filter for determining the output pixel value from the distribution of the plurality of output pixels.

14. The image processing apparatus of claim 7, wherein said image input terminal comprises a scanner.

15. The image processing apparatus of claim 7, wherein said image output terminal comprises a printer.

* * * * *